(12) United States Patent
Kawamoto

(10) Patent No.: US 8,798,894 B2
(45) Date of Patent: Aug. 5, 2014

(54) VEHICLE CONTROL UNIT

(75) Inventor: Takayoshi Kawamoto, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/292,514

(22) Filed: Nov. 9, 2011

(65) Prior Publication Data

US 2012/0116657 A1    May 10, 2012

(30) Foreign Application Priority Data

Nov. 10, 2010  (JP) ................. 2010-251628

(51) Int. Cl.
*F02D 28/00* (2006.01)

(52) U.S. Cl.
USPC ....................... 701/113; 123/179.4

(58) Field of Classification Search
USPC ............... 701/112, 113; 123/179.3, 179.4
See application file for complete search history.

(56) References Cited

U.S. PATENT DOCUMENTS

| | | | | |
|---|---|---|---|---|
| 6,434,475 | B2 * | 8/2002 | Kaneko et al. | 701/112 |
| 6,609,488 | B2 * | 8/2003 | Nagae et al. | 123/179.3 |
| 6,802,291 | B2 * | 10/2004 | Ujifusa | 123/179.4 |
| 6,832,151 | B2 * | 12/2004 | Kumazaki et al. | 701/112 |
| 7,041,028 | B2 * | 5/2006 | Foelsche | 477/3 |
| 7,085,646 | B2 * | 8/2006 | Tanaka et al. | 701/113 |
| 7,483,784 | B2 * | 1/2009 | Hata | 701/113 |
| 8,428,855 | B2 * | 4/2013 | Okumoto et al. | 701/113 |
| 2002/0112689 | A1 | 8/2002 | Nagae et al. | |
| 2006/0106525 | A1 * | 5/2006 | Hata | 701/113 |
| 2008/0093923 | A1 | 4/2008 | Mack | |
| 2009/0018744 | A1 | 1/2009 | Abe | |

FOREIGN PATENT DOCUMENTS

| | | |
|---|---|---|
| CN | 101111418 A | 1/2008 |
| EP | 1 197 653 A2 | 4/2002 |
| EP | 1 548 274 A2 | 6/2005 |
| EP | 1 566 540 A2 | 8/2005 |
| JP | 9-209790 A | 8/1997 |
| JP | 2002-122058 A | 4/2002 |
| JP | 2004-255977 A | 9/2004 |
| JP | 2008-25633 A | 2/2008 |
| JP | 2010-77904 A | 4/2010 |
| JP | 2010-144653 A | 7/2010 |

OTHER PUBLICATIONS

European Search Report issued on May 10, 2012.
Japanese Office Action mailed May 7, 2013 with English Translation.
Chinese Office Action in counterpart Application No. 201110353112.1 mailed Dec. 18, 2013 with English Translation.

* cited by examiner

*Primary Examiner* — Thomas Moulis
*Assistant Examiner* — Elizabeth Hadley
(74) *Attorney, Agent, or Firm* — Birch, Stewart, Kolasch & Birch, LLP

(57) ABSTRACT

A vehicle control unit includes an engine switch, an idling stop controller and a power supply controller. When the engine switch is depressed in a state where the engine is automatically stopped by the idling stop controller, the idling stop controller restarts the engine in a case where a relationship between an operating time during which the engine switch is depressed and a predetermined reference time satisfies a predetermined condition, and the power supply controller switches a power supply mode in a case where the relationship between the operating time and the reference time does not satisfy the predetermined condition.

3 Claims, 5 Drawing Sheets

VEHICLE CONTROL UNIT

BACKGROUND

The present invention is related to a vehicle control unit which is mounted in a vehicle equipped with an idling stop function.

There are a conventional engine starting system which includes an engine switch to be depressed to start and stop an engine and in which a power supply mode of supplying electrical energy to electrical systems of a vehicle through depression of the engine switch is switched into plural modes such as an OFF mode, an accessory mode and an ON mode (refer to Patent Document 1). In addition, there have been provided a vehicle which has an idling stop function to automatically stop and restart an engine according to driving conditions of the vehicle (refer to Patent Document 2). In the idling stop function, when the vehicle is stopped at an intersection, the engine is automatically stopped in the event that an automatic stopping condition is met which includes, for example, a condition that vehicle speed equals 0 and a condition that a brake pedal is not operated. In addition, in the idling stop function, the engine is restarted in the event that a restarting condition is met which includes a condition that the brake pedal depressed is released or an accelerator pedal is operated.

In a vehicle equipped with the engine starting system and the idling stop function, there occurs a situation in which the driver attempts to quicken the restart of the engine with intention, for example, a situation in which the vehicle is waiting to turn to the right at an intersection with the idling stop function implemented. In this case, the driver cannot move the vehicle at the intersection due to oncoming traffic, and therefore, the driver cannot restart the engine by releasing the brake pedal depressed. Consequently, the engine is designed to be restarted by the engine switch being depressed by the driver. Namely, the restart of the engine can be quickened by depressing the engine switch while the idling stop function is being implemented.

[Patent Document 1] JP-A-2002-122058
[Patent Document 2] JP-A-09-209790

SUMMARY

For example, in a case where the driver attempts to get out of the vehicle after all the electrical systems of the vehicle are turned off when the driver has driven the vehicle into a parking space in a parking area to stop the vehicle and has implemented the idling stop function, what should be done additionally by the driver is to turn off all the electrical systems of the vehicle because the engine is automatically stopped. Consequently, it is a most reasonable and natural action to be taken by the driver to depress the engine switch for turning off all the electrical systems of the vehicle with the brake pedal kept depressed. However, as has been described above, when the engine switch is depressed while the idling stop function is being implemented, the engine is restarted. Because of this, in reality, the engine switch needs to be depressed again after the engine is restarted by depressing the engine switch, or the engine is restarted by releasing the brake pedal operated, so that the power supply mode is switched from the ON mode to the OFF mode. As this occurs, the power supply mode becomes the OFF mode, and at the same time, the engine is stopped. Consequently, in this case, not only does the operation of the engine switch become complicated, but also a drawback is caused in which fuel is consumed wastefully by the unnecessary restart of the engine.

It is therefore one advantageous aspect of the present invention to provide a vehicle control unit which can increase operability of the engine switch without disturbing the idling stop function and which is superior in suppressing the wasteful consumption of fuel.

According to one advantage of the invention, there is provided a vehicle control unit comprising:

an engine switch configured to be depressed to start and stop an engine;

an idling stop controller configured to automatically stop and restart the engine according to driving conditions of a vehicle; and a power supply controller configured to switch a power supply mode of supplying electrical energy to electrical systems of the vehicle from a power supply in response to depression of the engine switch, wherein when the engine switch is depressed in a state where the engine is automatically stopped, the idling stop controller restarts the engine in a case where a relationship between an operating time during which the engine switch is depressed and a predetermined reference time satisfies a predetermined condition, and the power supply controller switches the power supply mode in a case where the relationship between the operating time and the reference time does not satisfy the predetermined condition.

The predetermined condition may be a condition that the operating time is shorter than the reference time.

The predetermined condition may be a condition that the operating time is equal to or longer than the reference time.

The power supply controller may switch the power supply mode to a first mode in which the supply of electrical energy to all the electrical systems of the vehicle from the power supply is stopped in the case where the relationship between the operating time and the reference time does not satisfy the predetermined condition.

the power supply controller may switch the power supply mode to either of a first mode in which the supply of electrical energy to all the electrical systems of the vehicle from the power supply is stopped and a second mode in which the supply of electrical energy to part of the electrical systems of the vehicle from the power supply is maintained while the supply of electrical energy to the remaining electrical systems from the power supply is stopped in the case where the relationship between the operating time and the reference time does not satisfy the predetermined condition.

The electrical systems to which the supply of electric energy from the power supply may be maintained in the second mode are accessory equipment equipped in the vehicle.

DETAILED DESCRIPTION OF EMBODIMENTS

Figure 1:
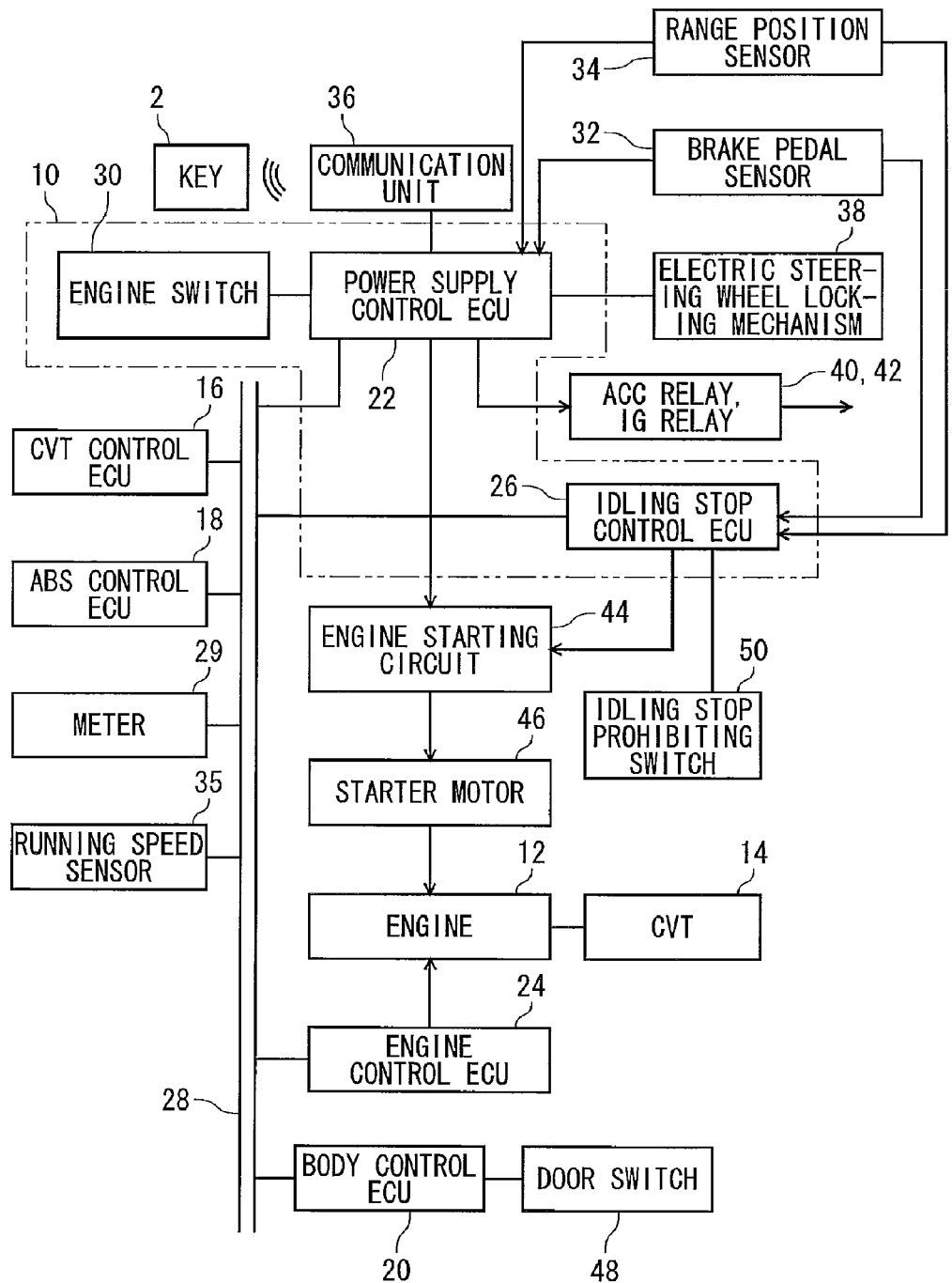
FIG. 1 is a block diagram showing a configuration of a vehicle control unit according to an embodiment of the invention.

Hereinafter, an embodiment of the invention will be described by reference to the drawings. FIG. 1 is a block diagram showing the configuration of a vehicle control system in which a vehicle control unit 10 according to this embodiment is mounted. In this embodiment, an engine 12, which is an internal combustion engine functioning as a drive source for running the vehicle, and a Continuously Variable Transmission (CVT) 14, which is a kind of automatic transmission into which power outputted from the engine 12 is inputted, are mounted in the vehicle, and consequently, the vehicle is a vehicle with an automatic transmission or AT (Automatic Transmission) vehicle. The invention can be applied to an AT vehicle which is equipped with a conventionally known automatic transmission including the CVT. The vehicle includes plural ECUs such as a CVT control ECU 16, an ABS control ECU 18, a body control ECU 20, a power supply control ECU 22, an engine control ECU 24 and an idling stop control ECU 26. These ECUs are connected together via a conventionally known communication line which includes a CAN (Controller Area Network) bus to send and receive information and data. Each of the ECUs 16, 18, 20, 22, 24, 26 includes a CPU, a ROM which stores control programs, a RAM as a working area of the control programs and an interface part which interfaces with peripheral circuits, and the ECUs operate by executing the control programs. Further, a meter 29 is connected to the communication line 28 and indicates various types of information on the vehicle. Each of the ECUs 16, 18, 20, 22, 24, 26 will be described later.

Additionally equipped on the vehicle are an engine switch 30, a brake pedal sensor 32, a range position sensor 34, a vehicle speed sensor 35, a communication unit 36, an electric steering wheel locking mechanism 38, an ACC relay 40, an IG relay 42, an engine starting circuit 44, a starter motor 46 and a door switch 48.

The engine switch 30 is depressed to start and stop the engine 12 and is also depressed to switch a power supply mode of supplying electrical energy to electrical systems of the vehicle from a power supply. The electrical systems of the vehicle are briefly divided into the following two systems:

(1) Accessory equipment: lighting system, meters, air conditioning system, audio system, and car navigation system; and
(2) Electronic equipment other than the accessory equipment: various types of electronic equipment operating in relation to running the vehicle, which includes the engine 12, the brake system, the CVT 14 and the ECUs 16, 18, 20, 22, 24, 26. In this embodiment, the following three modes are set to make up the power supply mode:
(1) OFF mode: a mode of stopping the supply of electrical energy to all the electronic equipment including the accessory equipment, which is all the electrical systems, from the power supply;
(2) ACC mode (Accessory mode): a mode of supplying electrical energy only to the accessory equipment from the power supply and stopping the supply of electrical energy to the electronic equipment other than the accessory equipment from the power supply; and
(3) ON mode: a mode of supplying electrical energy to all the electronic equipment including the accessory equipment from the power supply.

The OFF mode corresponds to a first mode described in claims of this patent application and the ACC mode to a second mode described in the claims.

The brake pedal sensor 32 detects whether a brake pedal is operated or released and sends a detection signal as the result of the detection to the power supply control ECU 22 and the idling stop control ECU 26. The brake pedal is depressed to be operated. The range position sensor 34 detects a position of a range shift lever (a selector lever) which shifts a running range of an automatic transmission of the vehicle and sends a detection signal as the results of the detection to the power supply control ECU 22 and the idling stop control ECU 26. The running ranges include, for example, P (park), R (reverse), N (neutral), D (drive), 2 (second gear) and L (low gear). The vehicle speed sensor 35 detects a running speed of the vehicle and supplies the result of the detection to the power supply control ECU 22 and the idling stop control ECU 26 via the communication line 28.

The communication unit 36 implements a wireless communication with a wireless key 2 carried by the driver via an antenna (not shown), and the power supply control ECU 22 implements an ID collation, which will be described later, through this wireless communication. The electric steering wheel locking mechanism 38 locks a steering wheel so as not to be turned based on the control by the power supply control ECU 22 and thus implements an anti-theft function.

The ACC relay 40 is a relay which switches on and off the supply of electrical energy to the accessory equipment from the power supply. The IG relay 42 is a relay which switches on and off the supply of electrical energy to the electronic equipment other than the accessory equipment from the power supply.

The engine starting circuit 44 turns the starter motor 46 based on the control by the power supply control ECU 22. The starter motor 46 turns to start the engine 12. The door switch 48 detects whether doors are opened or closed and supplies a detection signal as the result of the detection to the body control ECU 20.

The CVT control ECU 16 controls the CVT 14 so as to continuously change speeds. The ABS control ECU 18 controls an ABS (Anti-lock Brake System). The body control ECU 20 receives the detection signal from the door switch 48 to control the locking and unlocking of the doors. The power supply Control ECU 22 controls the electric steering wheel locking mechanism 38, the ACC relay 40, the IG relay 42 and the engine starting circuit 44 based on the signals from the engine switch 30, the brake pedal sensor 32 and the communication unit 36. The engine control ECU 24 controls the operation of the engine 12.

The idling stop control ECU 26 automatically stops and restarts the engine 12 according to the driving conditions of the vehicle and hence realizes an idling stop function. In this embodiment, the idling stop control ECU 26 is designed to disable or activate the idling stop function as an idling stop prohibiting switch 50 is switched on or off.

In this embodiment, the vehicle control unit 10 includes the engine switch 30, the power supply control ECU 22, and the idling stop control ECU 26. The power supply control ECU 22 makes up a power supply controller for switching the power supply mode of supplying electrical energy to the electrical systems of the vehicle from the power supply as the engine switch 30 is depressed. The idling stop control ECU 26 makes up an idling step controller for automatically starting and restarting the engine 12 according to the driving conditions of the vehicle. In this embodiment, the power supply controller and the idling stop controller are described as being realized by two independent ECUs. Alternatively, however, the power supply controller and the idling stop controller may arbitrarily be realized by a single ECU or three or more ECUs. In addition, the power supply control ECU 22 switches the power supply mode in a predetermined sequence every time the engine switch 30 is depressed when the engine switch 30 is depressed in such a state that a predetermined switching permitting condition is met. The predetermined sequence is an order of OFF mode, ACC mode, and ON mode. The switching permitting condition is such that the vehicle is driven into a parking space in a car park or in an individual's garage, the engine 12 is stopped and the brake pedal is released.

Figure 2:
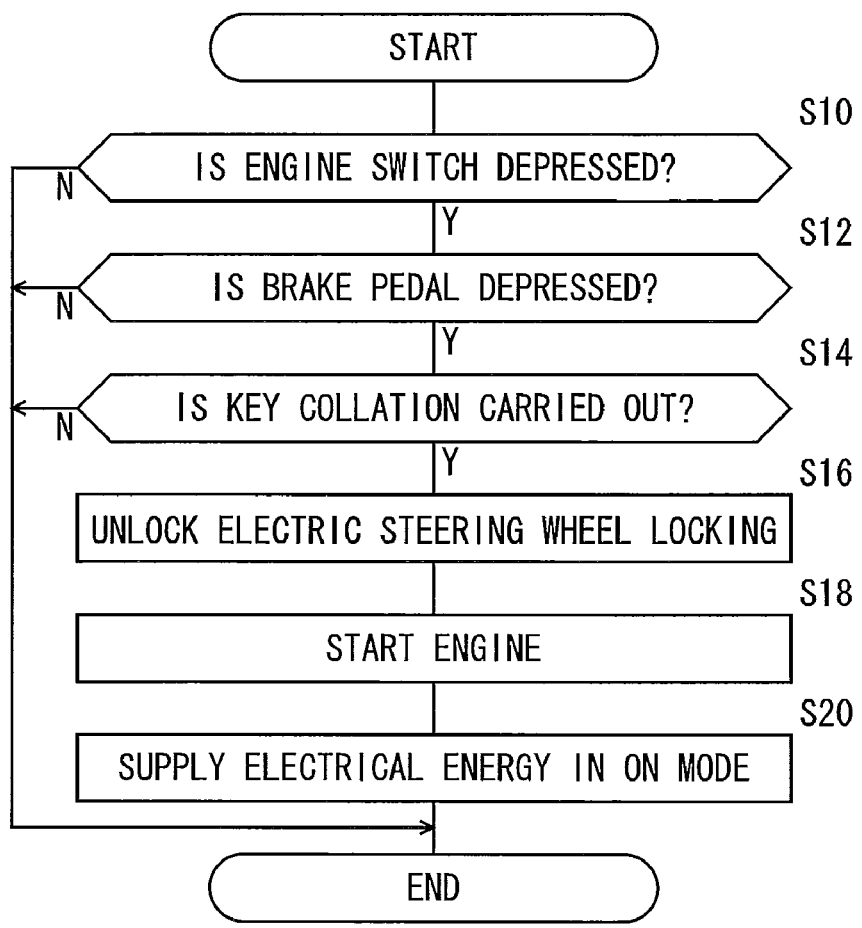
FIG. 2 is a flowchart showing operations that are to be performed when an engine is started.

Next, operations of the vehicle control unit 10 will be described. Firstly, an operation of the vehicle control unit 10 that is performed to start the engine 12 which is stopped will be described by reference to a flowchart shown in FIG. 2. Let's assume that the engine 12 is stopped in advance and the ACC relay 40 and the IG relay 42 are off. The power supply control ECU 22 determines whether or not the engine switch 30 has been depressed (step S10). If positive in step S10, the power supply control ECU 22 determines whether or not the brake pedal has been depressed based on the result of a detection made by the brake pedal sensor 32 (step S12). The determination in step S12 is made irrespective of a length of operation time which is a length of time during which the engine switch 30 is depressed. If positive in step S12, the power supply control ECU 22 implements a wireless communication with the wireless key 2 carried by the driver via the communication unit 36 to determine whether or not ID information stored in the wireless key 2 has already been registered. Namely, an ID collation is implemented (step S14). If the result of the ID collation made in step S14 is positive, the power supply control ECU 22 controls the electric steering wheel locking mechanism 38 to release the electric locking of the steering wheel, so that the steering wheel can be operated (step S16). Following this, the power supply control ECU 22 puts the state of the power supply into a start mode and gives an engine starting command to the engine starting circuit 44. As this occurs, the engine starting circuit 44 drives the starter motor 46 so that an output shaft starts cranking to thereby start the engine 12 (step S18). In the start mode, no electrical energy is supplied to the equipment which is not involved in starting the engine 12 from the power supply. When the engine 12 has been started, the power supply ECU 22 switches the state of the power supply from the start mode (the start position) to an ON mode (an ON position) so that electrical energy is supplied to all the electronic equipment including the accessory equipment from the power supply (step S20). On the contrary, if the results of the determinations made in steps S10, S12, S14 are negative, the operation of the vehicle control unit 10 is stopped.

Figure 3:
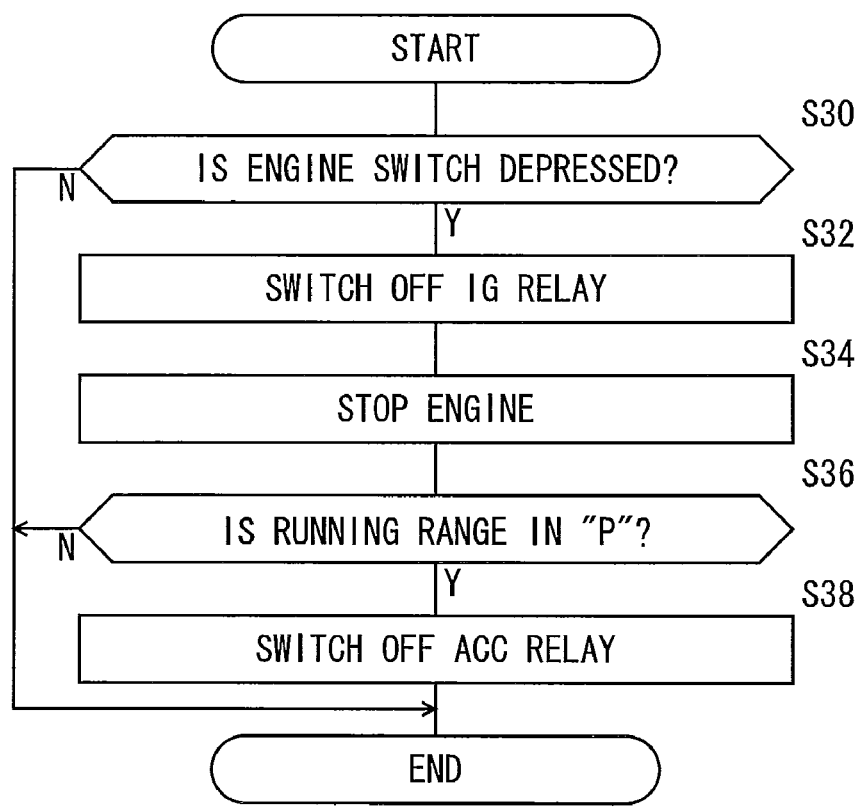
FIG. 3 is a flowchart showing operations that are to be performed when the engine is stopped.

Next, an operation of the vehicle control unit 10 that is performed to stop the engine 12 which is in operation will be described by reference to a flowchart shown in FIG. 3. In this example, it is assumed that the engine 12 operates in advance, the vehicle speed is constant and the ACC relay 40 and the IG relay 42 are on. The power supply control ECU 22 determines whether or not the engine switch 30 has been depressed (step S30). The determination in step S30 is made irrespective of a length of operation time which is a length of time during which the engine switch 30 is depressed. If positive in step S30, the power supply control ECU 22 switches off the IG relay 42 (step S32) and gives a stop-engine command or a stop-fuel-supply command to the engine control ECU 24 via the communication line 28, whereby the engine control ECU 24 stops the engine 12 (step S34). Further, the power supply control ECU 22 determines whether or not the running range is shifted to the P (park) position based on the result of a detection made by the range position sensor 34 (step S36). If positive in step S36, the power supply control ECU 22 switches off the ACC relay 40 (step S38). On the other hand, if negative in step S36, the operation is ended with the ACC relay 40 kept on. In addition, if negative in step S30, the operation is ended. The series of operations described above illustrates general control details that are to be executed when the vehicle speed is equal to or slower than a predetermined speed. When the vehicle speed exceeds the predetermined speed, the power supply control ECU 22 does not switch the state of the power supply even in the event that the engine switch 30 is depressed for a short period of time, irrespective of the position of the range shift lever. However, even in the event the vehicle speed exceeds the predetermined speed, when the engine switch 30 is depressed for a long period of time or is depressed repeatedly, judging that an emergency stopping operation is being performed, the power supply control ECU 22 switches off only the IG relay 42 and continues to supply electrical energy to all the electronic equipment including the accessory equipment from the power supply.

Next, an operation of the vehicle control unit 10 that is performed to activate the idling stop function will be described. Hereinafter, the operation of the vehicle control unit 10 that is performed to activate the idling stop function will be described separately for a case where an electric park locking function is equipped on the vehicle and a case where the electric park locking function is not equipped on the vehicle. Firstly, the electric park locking function will be described. An operation of the electric park locking function will be described as follows which is to be performed on a vehicle which is equipped with the electric steering wheel locking mechanism 38. When the power supply mode is switched to the OFF mode by depressing the engine switch 30 with the running range set in the P (park) position, the ACC relay 40 and the IG relay 42 are both switched off after the intention of the driver to get out of the vehicle is confirmed by a driver's side door being opened. Following this, the steering wheel is locked by the electric steering wheel locking mechanism 38. In this embodiment, the switching-off operation of the ACC relay 40 and the IG relay 42 and the locking operation of the steering wheel by the electric steering wheel locking mechanism 38 are described as being interlocked with each other. However, these two operations do not have to be interlocked with each other. According to the electric park locking function of this embodiment, with the running range set in any of the other range positions than the P position, when the power supply mode is switched to the OFF mode through the depression of the engine switch 30, the running range is shifted automatically to the P position. Then, both the ACC relay 40 and the IG relay 42 are switched off. Then, the steering wheel is locked by the electric steering wheel locking mechanism 38. In the case of the vehicle which is not equipped with the electric park locking function, with the running range set in the P position, as has been described above, both the ACC relay 40 and the IG relay 42 are switched off as the power supply mode is switched to the OFF mode through the depression of the engine switch 30, and the steering wheel is locked by the electric steering wheel locking mechanism 38 without any problem. However, in a case where the locking of the steering wheel by the electric steering wheel locking mechanism 38 is prohibited with the running range set in any of the other range positions than the P position, even if the power supply mode is attempted to be switched to the OFF mode through the depression of the engine switch 30, the power supply mode is forcibly set to the ACC mode in which the relay 40 is kept on and only the IG relay 42 is switched off.

Figure 4:
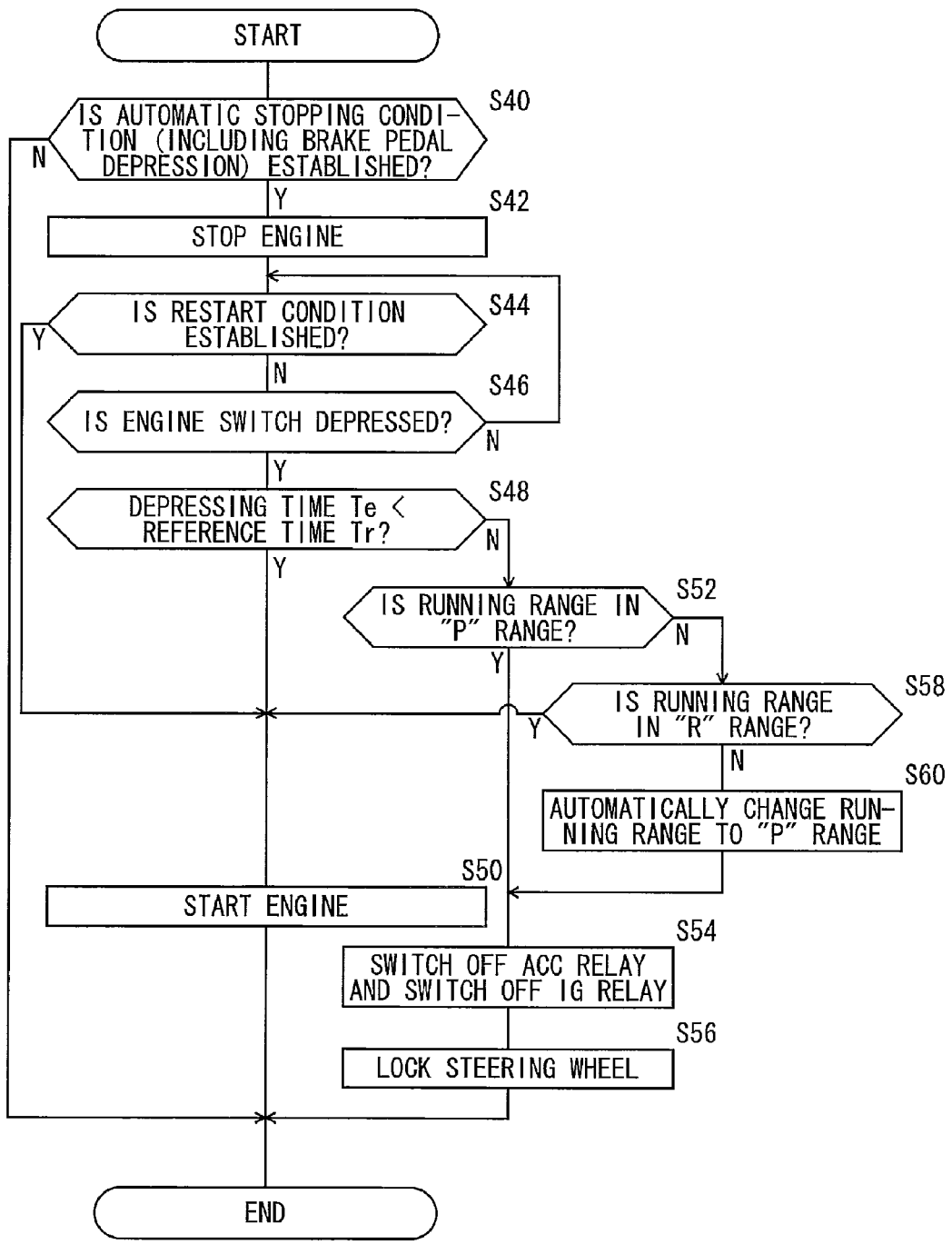
FIG. 4 is a flowchart showing idling stop operations that are to be performed in a vehicle equipped with an electric parking lock function.

Firstly, the case where the electric park locking function is equipped on the vehicle will be described by reference to a flowchart shown in FIG. 4. The idling control ECU 26 determines whether or not an automatic stopping condition to automatically stop the engine 12 has been met (step S40). The automatic stopping condition is such that the brake pedal is operated and the running speed of the vehicle is zero. Operating the brake pedal is depressing the brake pedal. Whether the brake pedal is depressed or not is determined based on the result of a detection made by the brake pedal sensor 32. Whether the running speed of the vehicle is zero or not is determined based on the result of a detection made by the vehicle speed sensor 35. If positive in step S40, the idling control ECU 26 gives a stop-engine command to the engine control ECU 24 via the communication line 28, whereby the engine control ECU 24 automatically stops the engine 12 (step S42). Namely, an idling stop operation is executed. If negative in step S40, the operation is ended. The power supply ECU 22 keeps the power supply mode in the ON mode while the idling stop operation is being performed. This is because in case the ACC relay 40 or the IG relay 42 is switched off, the electrical system of the vehicle is interrupted, and the accessory equipment or the electronic equipment other than the accessory equipment cannot be used, which is inconvenient. Next, the idling control ECU 26 determines whether or not a restarting condition to restart the engine 12 which has automatically been stopped is met (step S44). The restarting condition includes the release of the brake pedal operated. A state in which the operation of the brake pedal is released is a state in which the depression of the brake pedal is released. If positive in step S44, the idling control ECU 26 gives a start-engine command to the engine starting circuit 44, whereby the engine starting circuit 44 drives the starter motor 46, and the output shaft starts cranking, which starts the engine 12 (step S50).

If negative in step S44, the power supply control ECU 22 determines whether or not the engine switch 30 has been depressed (step S46). When the operation is executed in step S42, the power supply control ECU 22 receives information to the effect that idling is being stopped from the idling control ECU 26 via the communication line 28 and hence recognizes the situation in which idling is being stopped or not. If negative in step S46, the operation flow returns to step S44. On the contrary, if positive in step S46, the power supply control ECU 22 determines whether or not an operating time Te of the engine switch 30 is shorter than a reference time Tr (step S48). Namely, in step S48, whether the following expression (1) is established or not is determined.

$$Te < Tr \tag{1}$$

If positive in step S48, the operation flow proceeds to step S50, where the engine 12 is restarted.

If negative in step S48, in other words, if the operating time Te of the engine switch 30 is equal to or longer than the predetermined reference time Tr, the power supply control ECU 22 determines based on the result of the detection made by the range position sensor 34 whether or not the running range is set in the P (park) position (step S52). If positive in step S52, the power supply control ECU 22 sets the power supply mode to the OFF mode and switches off both the ACC relay 40 and the IG relay 42 (step S54). Following this, the power supply control ECU 22 controls the electric steering wheel locking mechanism 38 so as to lock the steering wheel and ends the idling stop operation (step S56). The operations in steps S46, S48, S52, S54, S56 are performed while the driver keeps depressing the brake pedal. In other words, the supply of electrical energy from the power supply is stopped by depressing the engine switch 30 with the brake pedal operation kept performed which occurs when the idling stop is implemented. These operations are similar to the normal parking operations. Namely, the driver depresses the brake pedal while the vehicle is running to stop the vehicle, shifts the running range of the transmission to the P (park) position while he or she keeps depressing the brake pedal and depresses the engine switch 30 to stop the engine 12. Because of this, the driver does not have to be forced to operate differently from the normal operations when the idling stop is effected, which is advantageous in ensuring the operability. On the contrary, if negative in step S52, the power supply ECU 22 determines based on the result of the detection made by the range position sensor 34 whether or not the running range is set in the R (reverse) position (step S58). If positive in step S58, the idling stop operation proceeds to step S50 to restart the engine 12. If negative in step S58, the electric park locking function automatically switches the running range to the P (park) position, and the idling stop operation proceeds to step S54.

In the description above, the idling stop operation is described as proceeding to step S50 to restart the engine 12 when the operating time Te of the engine switch 30 is shorter than the predetermined reference time Tr. However, the condition may be the other way round. Namely, the idling stop operation may proceed to step S50 to restart the engine when the operating time Te of the engine switch 30 is equal to or longer than the predetermined reference time Tr. As this occurs, when the operating time Te of the engine switch 30 is shorter than the predetermined reference time Tr, the idling stop operation proceeds to step S52.

Figure 5:
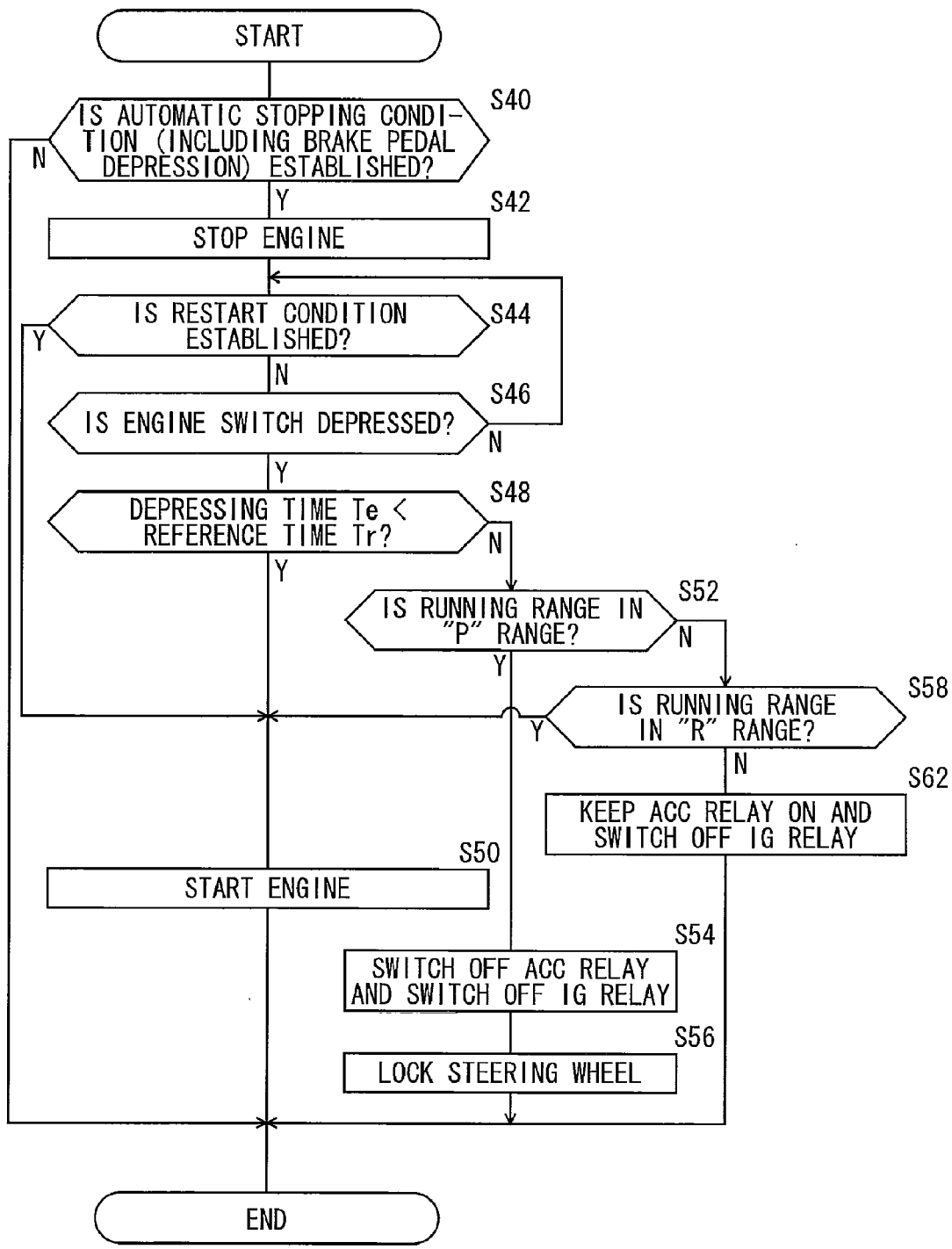
FIG. 5 is a flowchart showing idling stop operations that are to be performed in a vehicle equipped with no electric parking lock function.

Next, the case where the electric park locking function is not equipped on the vehicle will be described by reference to a flowchart shown in FIG. 5. In FIG. 5, like reference numerals will be given to like steps to those in FIG. 4, and the description thereof will be omitted. Thus, only an operation which differs from those in FIG. 4 will be described. As FIG. 5 shows, what differs from that in FIG. 4 is an operation which is performed when the result of the determination in step S58 is negative, that is, when the running range is set in any of the other range positions than P and R positions. When the running range is set in any of the other range positions than the P and R positions, the power supply control ECU 22 sets the power supply mode to the ACC mode, switches off the IG relay 42 while keeping the ACC relay 40 on and ends the idling stop operation (step S62).

Thus, as has been described heretofore, in this embodiment, when the engine switch 30 is depressed in such a state that the engine 12 is automatically stopped, the engine 12 is restarted when either of the condition that the operating time Te is shorter than the predetermined reference time Tr and the condition that the operating time Te is equal to or longer than the predetermined reference time Tr is met, and when the other condition is met, the power supply mode is switched to the first mode in which electric energy is supplied to all the electrical systems of the vehicle from the power supply or the second mode in which electrical energy is kept supplied to part of the electrical systems while the supply of electrical energy to the remaining electrical systems from the power supply is stopped. Because of this, in such a state that the idling stop is effected, restarting the engine 12 and stopping the supply of electrical energy to the electrical systems of the vehicle can be executed selectively in the simple and ensured fashion only by setting the operating time Te of the engine switch 30 shorter than the reference time Tr or equal to or longer than the reference time Tr. Namely, even when the driver intends to quicken the restart of the engine 12 as at an intersection or when the driver wants to stop the supply of electrical energy to the electrical systems of the vehicle from the power supply immediately as when parking the vehicle in a car park, the operations which match the intention of the driver can be performed accurately only through the simple operation to change the operating time of the engine switch. Moreover, when stopping the supply of electrical energy from the power supply, the engine 12 which has once automatically been stopped does not have to be restarted, although the engine 12 had to be restarted in the conventional idling stop systems. Therefore, the wasteful consumption of fuel can be prevented. Consequently, the increase in operability of the engine switch 30 can be realized without disturbing the idling stop function, and the wasteful consumption of fuel is advantageously suppressed.

Namely, according to the invention, in such a state that the idling stop is implemented, restarting the engine and stopping the supply of electrical energy to the electrical systems of the vehicle can be executed selectively in the simple and ensured fashion only by setting the operating time spent depressing the engine switch shorter than the reference time or equal to or longer than the reference time. Consequently, the increase in operability of the engine switch can be realized without disturbing the idling stop function, and the wasteful consumption of fuel is advantageously suppressed.

In addition, in this embodiment, the engine 12 is restarted when the operating time Te is shorter than the reference time Tr, and the supply of electrical energy from the power supply is stopped when the operating time Te is equal to or longer than the reference time Tr. Consequently, the engine 12 can be restarted within a short period of time. Thus, the invention is advantageous in quickening the restart of the engine 12 according to the intention of the driver.

On the contrary to the embodiment, a configuration may be adopted in which the supply of electrical energy fro the power supply is stopped when the operating time Te is shorter than the reference time Tr, and the engine 12 is restarted when the operating time Te is equal to or longer than the reference time Tr. As this occurs, the supply of electrical energy from the power supply can be achieved within a short period of time, and the invention is advantageous in quickening the supply of electrical energy from the power supply according to the intention of the driver.

In addition, in this embodiment, when the supply of electrical energy to the electrical systems from the power supply through depression of the engine switch 30 while the idling stop is effected, both the ACC relay 40 and the IG relay 42 are switched off, and hence, the supply of electrical energy to all the electrical systems from the power supply is stopped. However, for example, a configuration may be adopted in which the ACC relay 40 is kept on while the IG relay 42 is switched off, whereby the power supply mode is set to the ACC mode. In other words, the supply of electrical energy to part of the electrical systems from the power supply may be stopped. In order to set the power supply mode to the OFF mode when in the ACC mode, the brake pedal depressed is released while the power supply mode is in the ACC mode, and thereafter, the power supply mode is switched from the ACC mode to the OFF mode through depression of the engine switch 30. As this occurs, the power supply mode is switched over irrespective of the length of the operating time Te of the engine switch 30. This configuration can satisfy the requirement of the driver that he or she wants to use the accessory equipment for a certain period of time even after the engine 12 is stopped, and the invention is advantageous in realizing the improvement in convenience.

The invention is not limited to the embodiment that has been described heretofore but may be altered or modified variously without departing from the spirit and scope of the invention.

What is claimed is:

1. A vehicle control unit comprising:
   an engine switch configured to be depressed to start and stop an engine;
   an idling stop controller configured to automatically stop and restart the engine according to driving conditions of a vehicle; and
   a power supply controller configured to switch a power supply mode of supplying electrical energy to electrical systems of the vehicle from a power supply in response to depression of the engine switch, wherein
   wherein, when the engine switch is depressed in a state where the engine is automatically stopped,
   the idling stop controller restarts the engine in a case where a relationship between an operating time during which the engine switch is depressed and a predetermined reference time satisfies a predetermined condition, and
   the power supply controller, maintains the power supply mode in an ON mode when the idling stop controller stops the engine, and switches the power supply mode from the ON mode to an accessory mode in a case where the relationship between the operating time and the reference time does not satisfy the predetermined condition, the ON mode being a mode in which electrical energy is supplied to all of the electrical systems, the accessory mode being a mode in which the supply of electrical energy to part of the electrical systems of the vehicle from the power supply is maintained while the supply of electrical energy to the remaining electrical systems from the power supply is stopped, and
   wherein the electrical systems to which the supply of electric energy from the power supply is maintained in the accessory mode are accessory equipment equipped in the vehicle.

2. The vehicle control unit as set forth in claim 1, wherein the predetermined condition is a condition that the operating time is shorter than the reference time.

3. The vehicle control unit as set forth in claim 1, wherein the predetermined condition is a condition that the operating time is equal to or longer than the reference time.

* * * * *